United States Patent [19]

Webster

[11] 3,932,673

[45] Jan. 13, 1976

[54] FRUIT STUFFED WITH BRINE RESISTANT HARD GEL AND METHOD OF FORMING THE SAME

[75] Inventor: John R. Webster, Lindsay, Calif.

[73] Assignee: Lindsay Olive Growers, Lindsay, Calif.

[22] Filed: Jan. 10, 1975

[21] Appl. No.: 540,254

[52] U.S. Cl. .................. 426/49; 426/282; 426/577
[51] Int. Cl.² ........................................... A23B 7/10
[58] Field of Search .............................. 426/49, 170

[56] References Cited
UNITED STATES PATENTS

| | | | |
|---|---|---|---|
| 2,322,880 | 6/1943 | Pollak | 426/49 |
| 2,351,788 | 6/1944 | Smith | 426/102 |
| 2,356,287 | 8/1944 | Van Dellen | 426/49 |
| 2,382,682 | 8/1945 | Van Dellen | 426/803 |
| 2,791,508 | 5/1957 | Rivoche | 426/170 |

Primary Examiner—Jeanette M. Hunter
Attorney, Agent, or Firm—Huebner & Worrel

[57] ABSTRACT

A pitted drupe containing a crisp gel stuffing of finely divided vegetable material, low methoxyl pectin, a slowly soluble calcium salt, and acid to maintain the gel at a pH of from 2.8 to 3.9. The stuffed drupe is fermented in brine at the same pH.

18 Claims, No Drawings

FRUIT STUFFED WITH BRINE RESISTANT HARD GEL AND METHOD OF FORMING THE SAME

SUMMARY

The present invention relates to a crisp pectin gel, a drupe stuffed with said gel, as well as a storing brine for said stuffed drupe and methods of making the gel, drupe stuffed with the gel and the combined stuffed drupe and storing brine.

The problems solved by the present invention were encountered in the stuffing of olives and particularly in the stuffing of olives with pimiento and are conveniently illustrated in connection with such production. It is, of course, to be understood that the present invention is not to be limited to the stuffing with pimiento nor to the stuffing of olives per se, it being applicable to the stuffing of any pitted drupe with compositions of pimiento and other stuffing materials.

Fermented and pitted olives are conventionally stuffed with pimiento for use in martinis, salads, hors d'oeuvres and the like. Although exceedingly laborious, virtually all commercial stuffing of olives is performed by hand. Strips of pimiento are first sliced, folded with the shiny side outwardly disposed, and stuffed into the pit wells of previously pitted olives by means of tweezers. Because of the resultant high labor costs, virtually all stuffed olives are stuffed in foreign countries having low labor costs. In fact, labor costs have precluded the commercial production of stuffed olives in any significant volume in this country for decades.

As a result, extensive efforts have been expended over the years to produce a suitable mechanical olive stuffing machine or to provide a composition stuffing which could be applied in the flowable form and harden in position. The latter development is typified by U.S. Pat. No. 2,351,788 issued June 20, 1944. That patent described the preparation of a stuffing material at a temperature of from 100°F. to 120°F. consisting of a mixture of pimiento lactic acid and Agar-Agar, cooling the pitted olive to a temperature substantially below 95°F., injecting the prepared stuffing material into the pit cavity of the olive, and setting the stuffing material as a result of heat loss to the chilled olive. Although the present invention is an outgrowth of that shown and described in U.S. Pat. No. 2,351,788, the method and product thereof are subject to certain shortcomings which the industry has long sought to overcome. The heated stuffing material is difficult to control and frequently leaks from the stuffed olives prior to gelling. It is inconvenient to refrigerate the olives before stuffing and to maintain them in a chilled condition during stuffing. The stuffing material results in a paste rather than a gel of good brittle texture and the intended simulation of a strip of pimiento is unacceptable. The stuffing material cannot be polished and does not make an attractive appearance when faced against the interior side of a transparent bottle.

In view of the foregoing, the broad object of the present invention is to provide an improved stuffing material for pitted drupes.

Another object is to provide such a stuffing material which can be deposited in the drupe in flowable condition and subsequently gel to a crisp condition.

Another object is to provide an improved stuffing material which need not be heated for flowability.

Another object is to provide a stuffing material which can be deposited in the pit cavities of pitted drupes and solidified therein without the necessity of refrigerating the drupe receiving the same.

Another object is to provide a combined drupe and stuffing material therefor that is economical, capable of simulated natural stuffing materials such as pimiento strips, onions and the like and which is easy to deposit and solidify in the pit well of a pitted drupe.

Another object is to provide a combined stuffed drupe and storing brine capable of maintaining the stuffing material in the drupe in a crisp condition for protracted periods.

Another object is to provide an improved method of stuffing a pitted drupe.

Another object is to provide an improved method of forming a stuffed drupe and storing brine.

A specific object is to provide an improved stuffed olive containing a stuffing material of flowable form for ease in stuffing and which solidifies to a crisp condition and retains the crisp condition for a protracted period.

Another object is to provide a method for producing a stuffed olive which is more efficient than heretofore known and which produces a stuffing material which closely simulates strips of pimiento and remains crisp over protracted periods.

Another object is to provide a gel-type stuffing for olives which achieves a texture that is firm and brittle like strips of whole pimiento.

Another object is to provide a method for storing drupes stuffed gelatinized material which solidifies in the drupes and remains crisp over protracted periods.

Further objects and advantages will become apparent in the subsequent description in the specification.

DETAILED DESCRIPTION

To produce the gel of the present invention a finely divided puree of pimiento, onion or other food paste is prepared. The puree is mixed in a high-speed blender with from 2% to 10% by weight of low methoxyl pectin, .01% to .2% by weight of tri-calcium phosphate, or other source of calcium ions that is only slowly soluble in a weak acid solution and sufficient lactic acid or other edible acid to maintain the pH of the mixture between 2.8 and 3.9. Other suitable slowly soluble sources of calcium ions are monobasic calcium phosphate $Ca(H_2PO_4)_2$, dibasic calcium phosphate $CaHPO_4$, tribasic calcium phosphate $Ca_3(PO_4)_2$ and calcium phosphate $CaSO_4$. When employed in substitute for the tri-calcium phosphate from 0.02 to 0.46 percent by weight of mono calcium phosphate is used, from 0.01 to 0.27 percent by weight of dibasic calcium phosphate, from 0.01 to 0.2 percent by weight of tribasic calcium phosphate, or from 0.01 to 0.27 percent by weight of calcium sulfate. In terms of the calcium ion concentration achieved, it would be from 0.0039 to 0.078 percent by weight.

The preferred formula is:

| | |
|---|---|
| Unsalted pimiento puree | 93.9 parts by weight |
| low methoxyl pectin | 5.6 parts by weight |
| tri-calcium phosphate | .025 parts by weight |
| lactic acid (88%) | .55 parts by weight |

Low methoxyl pectins contrast with the more common pectins in that they do not require sugar for gel formation and are not as sensitive to pH as the more common pectins. These unique and useful properties result when about half or more of the methyl ester groups of regular pectin are removed, with a corresponding increase in the number of free acid or carboxyl groups. They are sensitive to calcium ions instead of sugar.

Low methoxyl pectins are commercially produced by the partial de-esterfication of regular pectin by any of four well known methods referred to as the Acids Method; Fixed Alkali or Dilute Aqueous Ammonia Systems; Enzymes, alone or in connection with Alkalis; and Ammonia in Alcoholic Systems. The low methoxyl pectins produced by the Acids Method are generally the least sensitive to calcium. Those produced by Enzymes are very sensitive to calcium. The other two are intermediate these two extremes with respect to calcium sensitivity. The ammonia hydrolyzed pectinate is preferred. It is made by treating regular pectin with ammonia in alcohol to remove many of the methoxy groups ($CH_3O$ — from the $COOCH_3$) leaving the form (—COOH) to react with the calcium to make the desired gel. The resultant molecular structure may contain as many as a thousand or more units of the following repetitious chain:

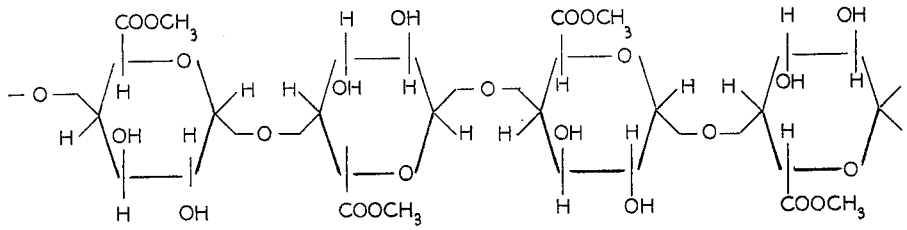

The mixture of the puree, slowly soluble calcium ion source and lactic acid is heated to a temperature of from 70°C. to 100°C. for from five to thirty minutes and then is cooled to room temperature. The higher the temperature of heating the shorter the time required. For examples, 17 minutes at 70°C., 10 minutes at 82°C. and 5½ minutes at 95°C. are adequate. Seventy minutes at 70°C., 30 minutes at 82°C. and 20 minutes at 95°C. are excessive temperatures and times which markedly degrade the gelling power of the pectin. If it is necessary to store the gel for any protracted period, it is stored in a brine subsequently to be described.

To achieve the desired crisp texture for the stuffing material, no equivalents are known for low methoxyl pectin which, although previously known for use in making soft tomato aspic, pudding and salad gels, have not been used, insofar as the applicant is aware, in near the quantities required in the present invention in any food stuffs. Gums such as locust bean gum, tragacanth, karaya and carbomethylcellulose have been tried in place of the low methoxyl pectin but when utilized with the described purees result in only thick pastes, entirely unsatisfactory for the purposes of the present invention. Alginates and xanthan gum also are found to produce gels too soft for the purpose and which absorb water and swell giving the olive stuffing a distorted expanded shape. A mixture of carrageenan and locust bean gum is capable of producing a gel with the described purees but it is much too soft for the purpose and requires a much lower solids content. Further, gels of Agar-Agar have the problem of exuding water from the gel known as syneresis. This shortens the life of the gel which is not suitable in the first place. Also the extra water makes the color light and dilutes the flavor. Agar-Agar makes a gel with the puree, as described in U.S. Pat. No. 2,351,788, but it is too runny when warm and thus difficult to retain in an olive and when cold is not hard enough. Further, the Agar-Agar mixtures require the olives to be thoroughly chilled to keep the stuffing from running through the olives when deposited therein.

To stuff the olives or other fruit, the gel is deposited in the pit wells thereof at approximately 65°C. while the olives are at room temperature. In approximately two minutes, the gel sets and the stuffed olives or other drupes are deposited in an aqueous brine.

The brine consists of an aqueous solution of from 5 to 9 percent by weight of sodium chloride, 0.31 to 1.85 percent by weight of calcium chloride, and sufficient acid to maintain the pH of the brine between 2.8 and 3.9. Calcium acetate or calcium lactate can also be used as suitable sources of the desired calcium ions but in any event the soluble calcium salts utilized should produce a calcium ion concentration of from 0.07 to 0.5 percent by weight.

The stuffed olives or other drupes are left in the brine for about fifteen days at room temperature to ferment out any sugar that may be left in the olives, pimiento puree or other vegetable material utilized. During the fermenting period, the brine is excluded from the air. If exposed to the air, a microbial surface growth occurs which produces a pectin softening enzyme. As a result, the brine is housed in a container which is completely full or under vacuum during the fermenting. While it is preferred to employ lactic acid to control the pH of the brine because of its flavor characteristics, any other acid whose presence is acceptable in a food product may be utilized.

In supplement to the above, certain observations are appropriate. It has been well known that low methoxyl pectin and water will make a gel without sugar if a little acid and a calcium salt is added to the solution and heated and then cooled. However, to make a brine resistant hard pectin food gel certain departures from prior knowledge and practices are required, as follows:

1. Approximately four times as much low methoxyl pectin is utilized as previously regarded as acceptable.
2. Much less calcium than previously employed must be utilized.
3. The calcium salt in the gel must be very slowly soluble in a weak acid. The calcium ions being di-valent can hook two pectin molecule chains together. The gel contains a high concentration of pectin having long molecular chains. A soluble calcium salt cannot be used in the gel because the pectin molecular chains become skinned over before the calcium completely diffuses through to link the chains together. With a very slowly soluble calcium salt, the calcium ions are given time to diffuse through the gel and link the long molecular chains of the pectin together. This is not a critical feature in the prior art soft gels for which low methoxyl pectin has been used because the reaction is slower and only a soft gel desired. However, in the practice of the present invention, it is essential to use a calcium salt which is only slowly soluble in a weak acid to allow the pectin to go into solution before the calcium dissolves and triggers the gelling action.

4. The amount of sodium salt in the gel must be kept to a minimum. As is well known, almost everything contains at least a minute trace of sodium chloride in it or on it. It is perhaps the most ubiquitous of compounds. However, it has been discovered that since sodium and calcium ions are both present in most gels and since both are capable of combining with the pectin, they cause the pectin to act similarly to an ion exchange resin. A high concentration of sodium ions forces some of the calcium out of the pectin and conversely a high concentration of calcium ions forces some sodium out of the pectin. Thus, to obtain the hard gel of the present invention, the sodium chloride present must be minimized or avoided as a constituent of the gel. The amount of sodium in the gel and in the brine has an effect on hardness of the gel because sodium can combine with the pectin without making a gel. Sodium, being monovalent can combine with one galacturonic acid unit of low methoxyl pectin but the single bond of the sodium atom cannot hook two pectin chains together to make a gel.

5. The brine in which the gel is stored either before stuffing a drupe or after stuffing the same, must contain at least about 0.07 to 0.5 percent by weight of calcium ions from whatever soluble calcium salt is used. When calcium chloride is employed, it is utilized in from about one-half of a percent to 2 percent by weight. Calcium acetate and calcium lactate can be substituted.

6. The brine must not contain more than approximately 9 percent by weight of sodium chloride.

7. When the gel is stored in the brine and when the residual sugars, if any, in the stuffed drupes or stuffing are fermented out in the brine, the surface of the brine must not be in contact with the air. If air is present, microbial surface growth occurs on the brine which produces pectin softening enzymes and interferes with the maintenance of the crisp condition of the gel.

8. The pH of the gel and of the brine must be maintained between a pH of approximately 2.8 and a pH of approximately 3.9.

9. In forming the gel, the unheated pectin mixture is dispersed in a finely divided state in a high-speed blender. After dispersal in the high-speed blender, the pectin mixture is maintained at a temperature of from 70°C. to 100°C. for not less than 5 minutes and not more than 30 minutes.

It will be noted that items 1 through 7 above are unique to the present invention and either are a complete departure from prior practices and knowledge in the art or are a complete reversal of such prior practices.

The gel of the present invention is easy to handle and to deposit in a pitted olive or other pitted drupes. At the time of such deposit, it is not so flowable as to leak from the olive and yet sufficiently flowable for ease of deposit. It does not require the prior chilling of the olive or other drupe and although it is preferably deposited warm, approximately 75°C., it need not be and should not be hot. Once the gel solidifies in the olive, it has a texture which is quite similar to that of freshly cut pimiento and retains such relatively hard and crisp texture indefinitely if contained in the described brine. It also can accurately simulate onions by substituting onion puree for the pimiento. Powdered cheese and water; powdered nuts and water; powdered, flavored, textured-soy-protein and the like can be substituted for the pimiento to achieve a crisp flavorful stuffing.

The exclusion of air from the brine as the residual sugars are fermented as well as when the gel and/or stuffed fruit is stored, avoids the surface formation of the microbial growth which produces pectin softening enzymes. The gel does not soften materially from its texture like whole vegetable flesh even when stored at room temperature for several years.

While the products and methods of the instant invention are described in terms of particular ingredients, and ranges thereof, to be used, it is obvious that modifications and variations in the nature and proportions of the ingredients may be made without departing from the spirit and scope of the invention, which is not to be limited to the illustrative details disclosed.

Having described my invention, what I claim as new and desire to secure by Letters Patent is:

1. A method of treating a pitted drupe having a pit well comprising depositing in the pit well a mixture containing a finely divided edible stuffing material having undesired sugar therein, a low methoxyl pectin gelling agent, and a slowly soluble source of calcium ions producing a calcium ion concentration of from at least about 0.0039 to 0.078 percent by weight, which mixture has previously been heated to from 100°C. to 70°C. for from five minutes to thirty minutes; and fermenting the sugar contained in the stuffing material while in the pit well in an aqueous solution of sodium chloride, a slowly soluble calcium salt and sufficient acid to maintain the pH of the solution between 2.8 and 3.9, the calcium ions from the calcium salt in the brine being present in at least about 1.4 to 5.5 percent by weight of the sodium chloride.

2. The method of claim 1 in which air is excluded from the solution during said fermentation to minimize microbial surface growth which produces pectin softening enzymes.

3. The method of claim 1 in which the drupe is a pitted olive previously cured by fermentation, and the stuffing material is pimiento.

4. The method of claim 1 in which the sodium chloride is present in the brine in at least about 5% to 9% by weight.

5. The method of claim 1 in which the mixture comprises finely divided pimiento, 2 to 10 percent by weight of low methoxyl pectin, and 0.01 to 0.2 percent by weight of the calcium salt.

6. The method of claim 5 in which the calcium salt is tri-calcium phosphate and the acid is lactic acid.

7. The method of claim 1 in which the soluble calcium salt is tri-calcium phosphate and the acid is lactic acid.

8. The method of claim 1 in which the mixture is cooled to at least about 65°C. before being deposited in the pit well.

9. The method of claim 4 in which air is excluded from the solution during said fermentation to minimize microbial surface growth which produces pectin softening enzymes.

10. A method of treating pitted olives cured by fermentation comprising intimately mixing approximately 94 parts by weight of finely divided edible stuffing material with from 2 to 10 percent parts by weight of low methoxyl pectin, from 0.01 to 0.2 percent by weight of tri-calcium phosphate and sufficient lactic acid to maintain the pH of the mixture between 2.8 and 3.9; heating the mixture to a temperature of from 100°C. to 70°C. for from five to 30 minutes; cooling the mixture to approximately 65°C; placing the mixture at a temperature which does not exceed about 65°C. in the pitted olives with the latter at approximately room temperature; placing the olives containing the mixture in a brine comprising an aqueous solution of from 5 to 9 percent by weight of sodium chloride, 0.07 to 0.5 percent by weight of calcium ions from a slowly soluble calcium salt, and sufficient acid to maintain the pH of the brine between about 2.8 and 3.9; and fermenting the olives and the mixture in the brine for a period sufficient to ferment any sugar contained by the olives or stuffing material while excluding air from the brine.

11. A food product comprising a pitted drupe having a pit cavity; and a hard pectin gel disposed in the pit cavity, said gel including a finely divided edible stuffing material intimately mixed with from 2 to 10 percent by weight of low methoxyl pectin, 0.01 to 0.2 percent by weight of a slowly soluble calcium salt and sufficient edible acid to maintain the pH of the gel between about 2.8 and 3.9.

12. The food product of claim 11 in which the drupe is a fermentation cured unsalted olive, the stuffing material is pimiento puree, and the calcium salt is tri-calcium phosphate.

13. The food product of claim 12 in which the acid is lactic acid.

14. In combination with a drupe having a pit cavity, a solidified stuffing material disposed in the pit cavity comprising finely divided unsalted edible vegetable material intimately mixed with from 2 to 10 percent by weight of low methoxyl pectin, 0.01 to 0.2 percent by weight of tri-calcium phosphate, and sufficient lactic acid to maintain the pH of the stuffing material between about 2.8 and 3.9.

15. The combination of claim 14 in which the drupe is a pitted unsalted olive and the vegetable material is pimiento.

16. The combination of pitted olives having pit cavities therein; a brine resistant solidified stuffing gel disposed in the pit cavities comprising finely divided unsalted edible vegetable material intimately mixed with from 2 to 10 percent by weight of low methoxyl pectin, 0.01 to 0.2 percent by weight of tri-calcium phosphate, and sufficient lactic acid to maintain the pH of the stuffing material between about 2.8 and 3.9; and a brine for fermenting any residual sugar in the olives and the vegetable material and for storing the stuffed olives comprising an aqueous solution of from 5 to 9 percent by weight of sodium chloride, 0.07 to 0.5 percent by weight of calcium ions from a soluble calcium salt, and sufficient acid to maintain the pH of the brine between about 2.8 and 3.9.

17. The combination of claim 16 in which the vegetable material is pimiento.

18. A method of treating a pitted olive having a pit well comprising mixing a finely divided edible stuffing material having undesirable sugar therein with from 2 to 10 percent parts by weight of low methoxyl pectin, a slowly soluble source of calcium ions in an amount sufficient to produce a calcium ion concentration of at least about 0.0039 to 0.078 percent by weight, and sufficient lactic acid to maintain the pH of the mixture between 2.8 and 3.9; heating the mixture to a temperature of from 100°C. to 70°C. for from five to thirty minutes; placing the mixture in the pit well of the olive; and fermenting the sugar contained in the stuffing material while in the pit well in an aqueous solution of from 5 to 9 percent by weight of sodium chloride, in the presence of a calcium ion concentration of from 0.07 to 0.5 percent by weight and sufficient acid to maintain the pH of the solution between 2.8 and 3.9.

* * * * *

UNITED STATES PATENT AND TRADEMARK OFFICE
CERTIFICATE OF CORRECTION

PATENT NO. : 3,922,673
DATED : January 13, 1976
INVENTOR(S) : John R. Webster

It is certified that error appears in the above-identified patent and that said Letters Patent are hereby corrected as shown below:

Column 1, Line 68,

After "flowability", Insert ---during the stuffing operation although heated prior thereto to precondition it for subsequent gelling.---.

Column 2, Line 31,

After "stuffed", insert ---with---.

Signed and Sealed this

Third Day of August 1976

[SEAL]

Attest:

RUTH C. MASON
*Attesting Officer*

C. MARSHALL DANN
*Commissioner of Patents and Trademarks*